United States Patent
Okajima

(10) Patent No.: US 7,083,239 B2
(45) Date of Patent: Aug. 1, 2006

(54) BICYCLE RIM

(75) Inventor: Shinpei Okajima, Izumi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/626,731

(22) Filed: Jul. 25, 2003

(65) Prior Publication Data

US 2004/0222689 A1 Nov. 11, 2004

Related U.S. Application Data

(63) Continuation-in-part of application No. 10/430,396, filed on May 7, 2003.

(51) Int. Cl.
B60B 25/00 (2006.01)
B60B 21/06 (2006.01)

(52) U.S. Cl. .................... 301/95.108; 301/58

(58) Field of Classification Search ............. 301/55, 301/58–59, 61, 95.101, 95.104, 95.107, 95.108, 301/104, 67; 29/894.33–894.333
See application file for complete search history.

(56) References Cited

U.S. PATENT DOCUMENTS

| | | | |
|---|---|---|---|
| 183,647 A | | 10/1876 | Danford |
| 382,658 A | * | 5/1888 | Nickerson ............. 301/95.105 |
| 395,523 A | | 1/1889 | Taylor |
| 399,453 A | | 3/1889 | Warwick |
| 416,190 A | * | 12/1889 | Terry ............................ 301/58 |
| 446,189 A | | 2/1891 | Overman |
| 452,649 A | | 5/1891 | Powell |
| 486,995 A | * | 11/1892 | Weinmann et al. ........... 301/67 |
| 521,385 A | | 6/1894 | Mosely |
| 556,124 A | * | 3/1896 | Wolff ........................... 301/58 |
| 574,139 A | * | 12/1896 | Curry ........................... 301/56 |
| 651,981 A | * | 6/1900 | Singer .......................... 301/67 |
| 657,435 A | * | 9/1900 | Minshall ....................... 301/67 |
| 737,007 A | * | 8/1903 | Newton ........................ 301/58 |
| 804,617 A | | 11/1905 | Newton |
| 873,911 A | * | 12/1907 | Starley ......................... 301/70 |
| 1,212,803 A | * | 1/1917 | Murray ........................ 301/67 |
| 1,286,065 A | | 11/1918 | Murray |
| 1,316,605 A | | 9/1919 | Wagenhorst |
| 1,367,092 A | | 2/1921 | Porter |
| 1,451,911 A | | 4/1923 | Johnson |
| 1,469,769 A | | 10/1923 | Booth |
| 1,484,844 A | | 2/1924 | Olle |
| 1,584,576 A | | 5/1926 | Wagenhorst |
| 1,635,849 A | * | 7/1927 | Isguerra ....................... 301/58 |
| 1,649,678 A | | 11/1927 | Freivogel |
| 1,676,303 A | | 7/1928 | Wagenhorst |

(Continued)

FOREIGN PATENT DOCUMENTS

EP 0130449 A2 1/1985

(Continued)

*Primary Examiner*—Jason R. Bellinger
(74) *Attorney, Agent, or Firm*—Global IP Counselors

(57) ABSTRACT

A reinforced annular bicycle rim is provided that includes a tire attachment portion and a spoke attachment portion fixedly coupled with the tire attachment portion to form an annular hollow area. A plurality of separate reinforcement members are fixedly coupled to an exterior surface of the spoke attachment portion to effectively increase the thickness of the rim at circumferentially spaced locations. Each of the reinforcement members is located exteriorly of the hollow area. Openings extend through the reinforcement members and the spoke attachment portion to couple spokes to the rim. A method of making such a rim is also provided. Preferably, the reinforcement members are welded or brazed to the spoke attachment portion, and then the openings are formed in the spoke attachment portion and the reinforcement members.

35 Claims, 12 Drawing Sheets

U.S. PATENT DOCUMENTS

| | | | | |
|---|---|---|---|---|
| 1,722,855 | A | * | 7/1929 | Owen et al. ............... 301/67 |
| 2,937,905 | A | * | 5/1960 | Altenburger ............... 301/58 |
| 4,583,787 | A | | 4/1986 | Michelotti |
| 4,793,659 | A | | 12/1988 | Oleff et al. |
| 5,110,190 | A | | 5/1992 | Johnson |
| 5,499,864 | A | | 3/1996 | Klein et al. |
| 5,651,591 | A | | 7/1997 | Mercat et al. |
| 5,769,584 | A | * | 6/1998 | Claes ............... 301/58 |
| 5,806,935 | A | | 9/1998 | Shermeister |
| 5,829,299 | A | | 11/1998 | Wessels |
| 6,024,413 | A | * | 2/2000 | Dixon et al. ............... 301/58 |
| 6,155,651 | A | | 12/2000 | Mizata et al. |
| 6,213,562 | B1 | | 4/2001 | Muraoka et al. |
| 6,216,344 | B1 | | 4/2001 | Mercat et al. |
| 6,224,165 | B1 | | 5/2001 | Mercat et al. |
| 6,257,676 | B1 | | 7/2001 | Lacombe et al. |
| 6,367,883 | B1 | | 4/2002 | Chen |
| 6,378,953 | B1 | | 4/2002 | Mercat et al. |
| 6,402,256 | B1 | | 6/2002 | Mercat |
| 6,431,658 | B1 | * | 8/2002 | Nakajima et al. ............... 301/59 |
| 6,443,533 | B1 | * | 9/2002 | Lacombe et al. ...... 301/95.104 |
| 6,715,844 | B1 | * | 4/2004 | Dietrich ............... 301/58 |
| 2002/0014293 | A1 | | 2/2002 | Passarotto |
| 2004/0222691 | A1 | * | 11/2004 | Okajima ............... 301/58 |

FOREIGN PATENT DOCUMENTS

| | | |
|---|---|---|
| EP | 0714791 A1 | 6/1996 |
| EP | 0715001 A1 | 6/1996 |
| EP | 1167078 A1 | 1/2002 |
| JP | 639502 U | 5/1994 |
| JP | 7501022 A | 2/1995 |
| TW | 313981 | 8/1997 |

* cited by examiner

BICYCLE RIM

CROSS-REFERENCE TO RELATED APPLICATIONS

This application is a continuation-in-part (CIP) application of U.S. patent application Ser. No. 10/430,396 filed on May 7, 2003. The entire disclosure of U.S. patent application Ser. No. 10/430,396 is hereby incorporated herein by reference.

BACKGROUND OF THE INVENTION

1. Field of the Invention

This invention generally relates to a bicycle wheel. More specifically, the present invention relates to a reinforced rim of the bicycle wheel and a method of making the rim.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

The above types of wheels have been designed for use with tube tires or tubeless tires. Typically, tubeless tire wheels have an annular seal arranged to seal the spoke attachment openings of the rim. Rims designed for tube tires also often have an annular member covering the spoke attachments. In any case, these typical types of wheels can be expensive and complicated to manufacture and assemble. Moreover, these typical wheels are not always as strong and lightweight, as desired. Furthermore, with these typical wheels it can be difficult, complicated and/or expensive to replace a spoke or spokes.

In view of the above, it will be apparent to those skilled in the art from this disclosure that there exists a need for an improved bicycle rim for a bicycle wheel and method of making such a rim. This invention addresses this need in the art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a rim that is relatively simple and inexpensive to manufacture and assemble.

Another object of the present invention is to provide a method for making a rim that is relatively strong yet relatively lightweight rim.

Still another object of the present invention is to provide a method of making a rim that is relatively simple and inexpensive.

The foregoing objects can basically be attained by providing a bicycle rim comprising an annular tire attachment portion adapted to have a tire mounted thereon, an annular spoke attachment portion and a plurality of separate reinforcement members. The annular spoke attachment portion is fixedly coupled with the tire attachment portion to form an annular hollow area. The spoke attachment portion includes a plurality of circumferentially spaced attachment openings with each attachment opening having a central axis. The plurality of reinforcement members are fixedly coupled to an exterior surface of the spoke attachment portion at the attachment openings to effectively increase the thickness of the spoke attachment portion of the rim at the attachment openings. Each of the reinforcement members is located exteriorly of the hollow area and has a through opening that is aligned with one of the attachment openings.

The foregoing objects can also basically be attained by providing a method of making a bicycle rim that comprises forming an annular rim, fixedly coupling a plurality of reinforcement members to the rim and forming a plurality of attachment openings. The forming of the annular rim creates an annular tire attachment portion and an annular spoke attachment portion fixedly coupled with the annular tire attachment portion to form an annular hollow area. The plurality of reinforcement members are fixedly coupled to an exterior surface of the spoke attachment portion such that the reinforcement members are located exteriorly of the annular hollow area in a circumferentially spaced arrangement to effectively increase the thickness of the spoke attachment portion. The plurality of attachment openings are formed such that one of the attachment openings extends through one of the reinforcement members and through the spoke attachment portion of the rim.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
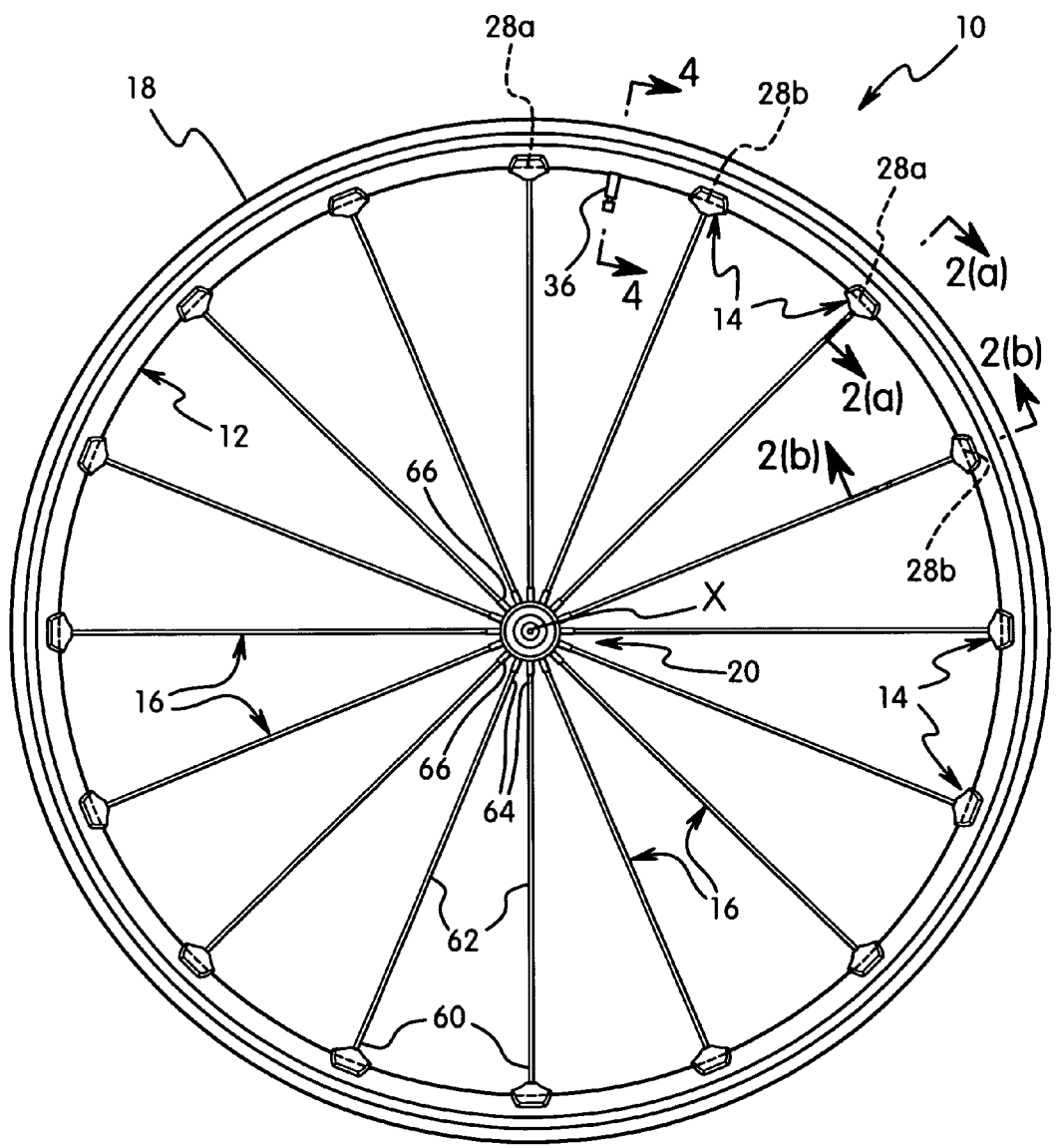
FIG. 1 is a side elevational view of a bicycle wheel with a reinforced rim in accordance with a first preferred embodiment of the present invention.

Referring initially to FIG. 1, a bicycle wheel 10 is illustrated in accordance with a first embodiment of the present invention. The bicycle wheel 10 utilizes a reinforced rim 12 that has a plurality of reinforcement members 14 fixedly coupled thereto in accordance with the present invention. When the reinforcement members 14 are fixedly coupled to the rim 12, the reinforcement members 14 form part of the rim 12. Thus, the bicycle wheel 10 basically includes the rim 12 with the reinforcement members 14, a plurality of spokes 16, a pneumatic tire 18 and a center hub 20. The tire 18 can include a tube (not shown) and a separate tire, or can be a tubeless type tire, as discussed below in more detail.

In the illustrated embodiment, the spokes 16 are radial spokes that connect the hub 20 to the rim 12. Preferably eight of the spokes 16 extend to one side of the hub 20, while the other eight spokes 16 extend to the other side of the hub 20, as explained below. In the illustrated embodiment, the hub 20 is a front hub (i.e. the hub 20 does not include one or more sprockets) that utilizes sixteen radial spokes 16 coupled to the rim 12 at equally spaced circumferential locations as seen in FIG. 1.

Of course, it will be apparent to those skilled in the art from this disclosure that bicycle wheel 10 could use a modified rim and/or hub in order to accommodate different spoking arrangements (e.g. all tangential spokes, some tangential spokes and some radial spokes, etc.) without departing from the scope of the present invention. It will also be apparent to those skilled in the art from this disclosure that bicycle wheel 10 could use a modified rim and/or hub in order to accommodate one or more sprockets, as needed and/or desired. Finally, it will also be apparent to those skilled in the art from this disclosure that the bicycle wheel 10 could use a modified rim and/or hub in order to accommodate fewer or more spokes 16 if needed and/or desired. In any case, the spokes 16 are preferably coupled to the annular rim 12 in a circumferentially spaced arrangement.

The rim 12 is an annular member designed for rotation about a center axis X. The rim 12 is constructed of a substantially rigid material, such as those materials that are well known in the art. For example, the rim 12 can be constructed of any suitable metallic material, such as plated steel, stainless steel, aluminum, magnesium or titanium, as well as other non-metallic materials, such as a carbon fiber composite. Preferably, the rim 12 is constructed of aluminum. The construction of the rim 12 will be discussed in more detail below.

Referring to FIGS. 1–4, the rim 12 is substantially circular as seen in side elevation (FIG. 1). The rim 12 basically includes an outer annular portion 24, an inner annular portion 26 with a plurality of attachment openings 28a and 28b, and the plurality of the reinforcement members 14 fixedly coupled to the inner annular portion 26 at the attachment openings 28a and 28b to reinforce the rim 12. The outer annular portion 24 is a tire attachment portion, while the inner annular portion 26 is a spoke attachment portion.

Basically, the outer annular portion 24 and the inner annular portion 26 are shaped such that the rim 12 has a uniform cross-sectional profile as seen in FIGS. 2(a)–4, except for the absence of material at various openings formed in the rim 12 and the presence of the reinforcement members 14 at circumferentially spaced locations, as described herein. Each of the reinforcement members 14 has a varying cross-sectional profile in the circumferential direction as best seen in FIGS. 2(a)–3(b), as explained below in more detail. Thus, the outer annular portion 24 and the inner annular portion 26 each have a symmetrical cross-sectional shape relative to a center plane P that is perpendicular to the center axis X of the wheel 10. However, the rim 12 is not completely (i.e. not exactly or perfectly) symmetrical relative to the center plane P due to the arrangements of the attachment openings 28a and 28b and the presence of the reinforcement members 14.

Specifically, each of the attachment openings 28a and 28b has a central axis C that is angled relative to the center plane P so that alternating spokes 16 extend to opposite ends of the central hub 20. In other words, the attachment openings 28a and 28b are preferably angled relative to the center plane P in an alternating manner. The reinforcement members 14 have a similar configuration, as discussed below in more detail. In any case, the rim 12 preferably has a substantially symmetrical shape relative to the center plane P of the wheel 10.

The inner annular portion 26 of the rim 12 is fixedly coupled with the outer annular portion 24 to form an annular hollow area A. The inner annular portion 26 preferably has a U-shaped or V-shaped cross-section with the outer ends of the inner annular portion 26 coupled to opposite axial sides of the outer annular portion 24 to form the annular hollow area A. The inner annular portion 26 is designed to have the spokes 16 coupled thereto.

The outer annular portion 24 also preferably has a substantially U-shaped cross-section with the free ends of the outer annular portion 24 designed to retain the tire 18. The outer annular portion 24 is preferably integrally formed with the inner annular portion 26 as a one-piece unitary aluminum member that is separate from the reinforcement members 14 to form a constant cross-sectional shape about the entire circumference of the outer annular portion 24 and the inner annular portion 26 of the rim 12 in a relatively conventional manner.

The reinforcement members 14 are preferably formed as separate aluminum members from the outer annular portion 24 and the inner annular portion 26. The reinforcement members are preferably formed by casting, machining and/or any other suitable manufacturing technique. The reinforcement members 14 are fixedly coupled to the inner annular portion 26 of the rim 12, preferably by welding or brazing in order to reinforce the rim 12.

Figure 3A:
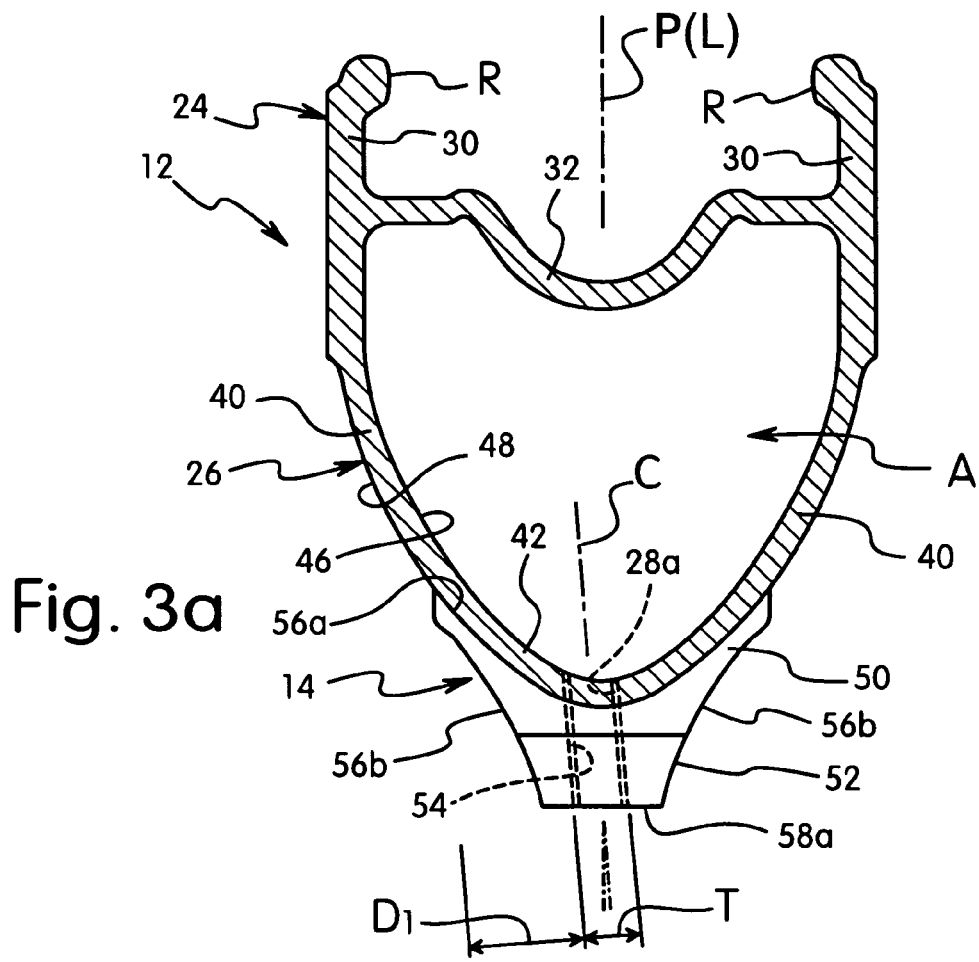
FIG. 3(a) is an enlarged, partial cross-sectional view of the bicycle wheel illustrated in FIG. 1 with the tire and spokes removed for the purpose of illustration, as seen along section line 2(a)—2(a) of FIG. 1, and with the reinforcement member shown in elevation for the purpose of illustration.
Figure 3B:
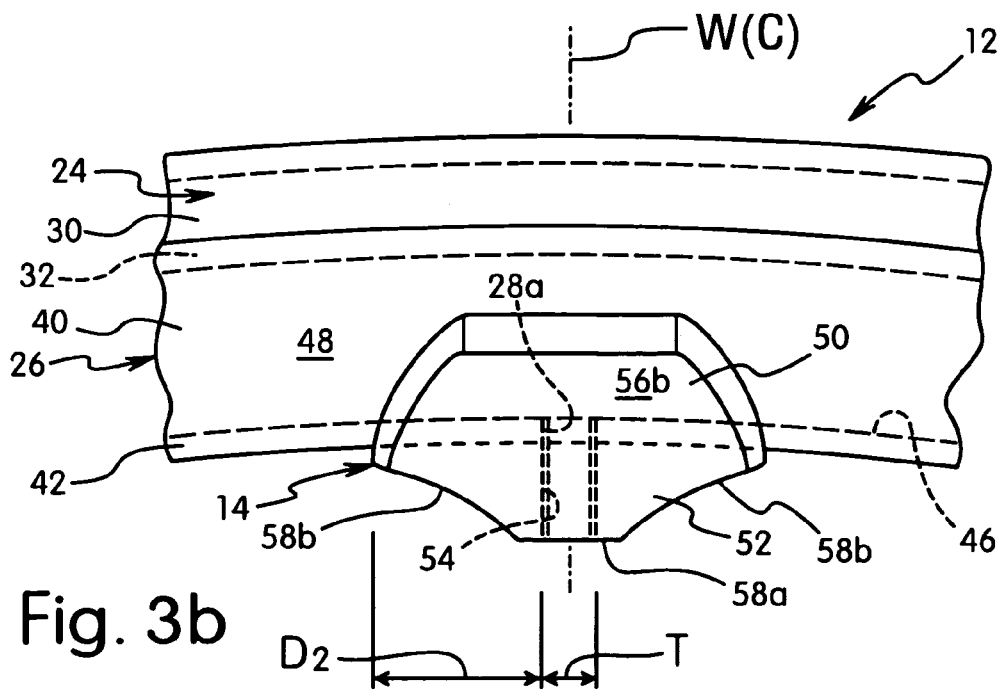
FIG. 3(b) is a side (axial) elevational view of the portion of the rim illustrated in FIG. 3(a)
Figure 4:
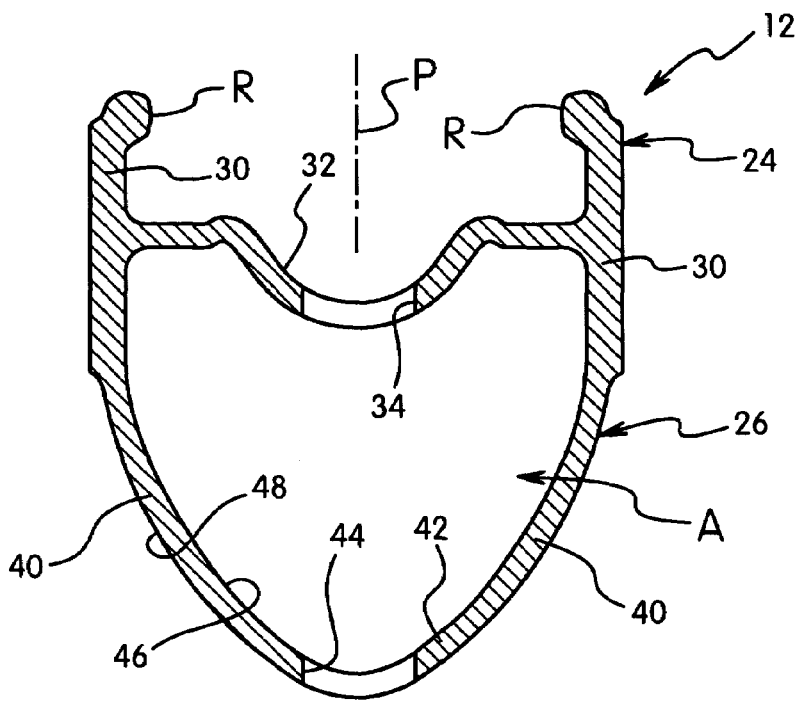
FIG. 4 is an enlarged, partial cross-sectional view of the bicycle wheel illustrated in FIGS. 1–3 with the tire removed for the purpose of illustration, as seen along section line 4—4 of FIG. 1.

Referring still to FIGS. 1–4, the outer annular portion 24 basically includes a pair of annular side sections or tire support sections 30 and an annular outer bridge or connecting section 32. The annular connecting section 32 extends between the annular side sections 30 to form a substantially U-shaped tire receiving recess as seen in cross-section (FIGS. 2–4). The annular side sections 30 are annular plate shaped members that are preferably between about 1.1 and about 1.4 millimeters thick that form a pair of annular tire supporting surfaces and a pair of annular braking surfaces in a conventional manner.

The tire supporting surfaces of the annular side sections 30 are annular opposed planar annular surfaces that face each other toward the center plane P. The tire supporting surfaces have annular ribs R formed at their free ends to retain beads of the tire 18 in a conventional manner. The annular ribs R project axially toward each other. The annular braking surfaces of the annular side sections 30 are annular opposed planar annular surfaces that face outwardly away from the center plane P to engage conventional rim brakes. The radially inner ends of the annular side sections 30 are fixedly coupled to the inner annular portion 26.

The annular connecting section 32 is a tubular member that has a varying thickness, preferably between about 0.8 and about 1.0 millimeters thick. The annular connecting section 32 is thicker in the central area that overlaps the center plane P. The annular connecting section 32 preferably has a varying, contoured shape, as shown in FIGS. 2(a) to 4. The annular connecting section 32 preferably includes a single valve aperture 34 formed therein for coupling a valve 36 therein in a conventional manner, as seen in FIGS. 1 and 4. The annular connecting section 32 is fixedly coupled to the annular side sections 30 at radial positions between the inner and outer ends of the annular side sections 30. Preferably, the connecting section 32 is free of openings, except for the single valve aperture 34 such that the tire 18 can be a tubeless tire.

Of course, it will be apparent to those skilled in the art from this disclosure that the tire 18 could be a tube-type tire (not shown), and that the valve aperture 34 could receive the valve of a tube (not shown) in a conventional manner. Thus, the valve aperture 34 and/or the valve 36 can be designed for a tubeless tire in a conventional manner, and/or for a tube-type tire in a conventional manner. In any case, because the valve 36 is conventional, the valve 36 will not be discussed and/or illustrated in detail herein.

Referring still to FIGS. 1–4, the inner annular portion 26 is a curved tubular member that has U-shaped or V-shaped cross-sectional shape. The inner annular portion 26 preferably has a varying thickness between about 0.8 and about 1.0 millimeters. The inner annular portion 26 basically includes a pair of annular slanted sections 40 and an inner annular section 42 fixedly coupled to the slanted sections 40. The annular slanted sections 40 and the inner annular section 42 of the inner annular portion 26, and the annular side sections 30 and annular connecting section 32 of the outer annular portion 24 are preferably integrally formed together as a one-piece, unitary member that is separate from the reinforcement members 14.

The plurality of attachment openings 28a and 28b are formed in the inner annular section 42 and are designed to have the spokes 16 mounted therein. The slanted sections 40 preferably have thicknesses of about 0.8 millimeters, while the inner annular section 42 preferably has a thickness of about 1.0 millimeters. Gradual transition areas are located between the annular slanted sections 40 and the inner annular section 42. Outer radial ends of the slanted sections 40 are fixedly coupled to inner radial ends of the annular side sections 30 of the outer annular portion 24. Inner radial ends of the slanted sections 40 are fixedly coupled to outer radial ends of the inner annular section 42.

Figure 2A:
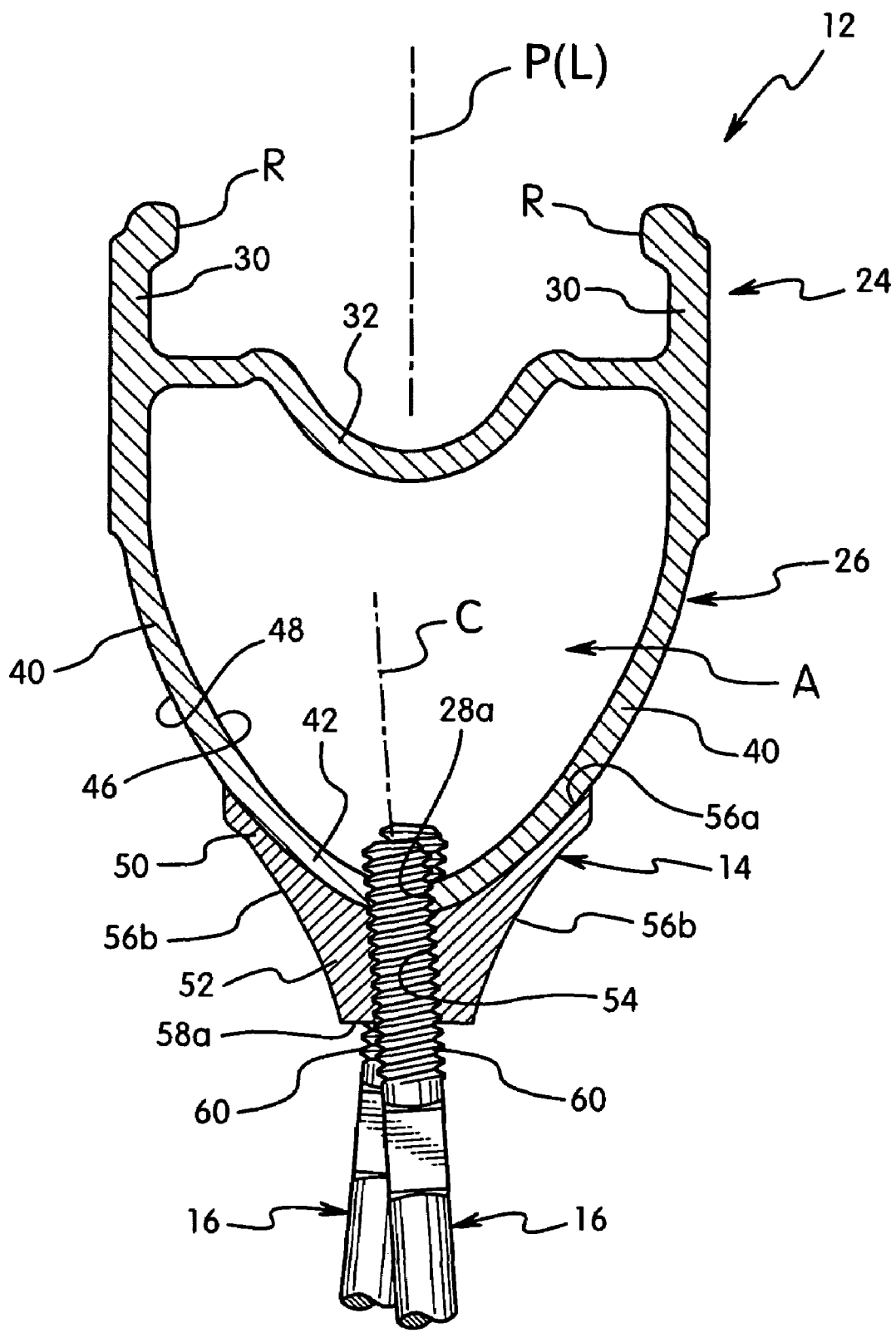
FIG. 2(a) is an enlarged, partial cross-sectional view of the bicycle wheel illustrated in FIG. 1 with the tire removed for the purpose of illustration, as seen along section line 2(a)—2(a) of FIG. 1.
Figure 2B:
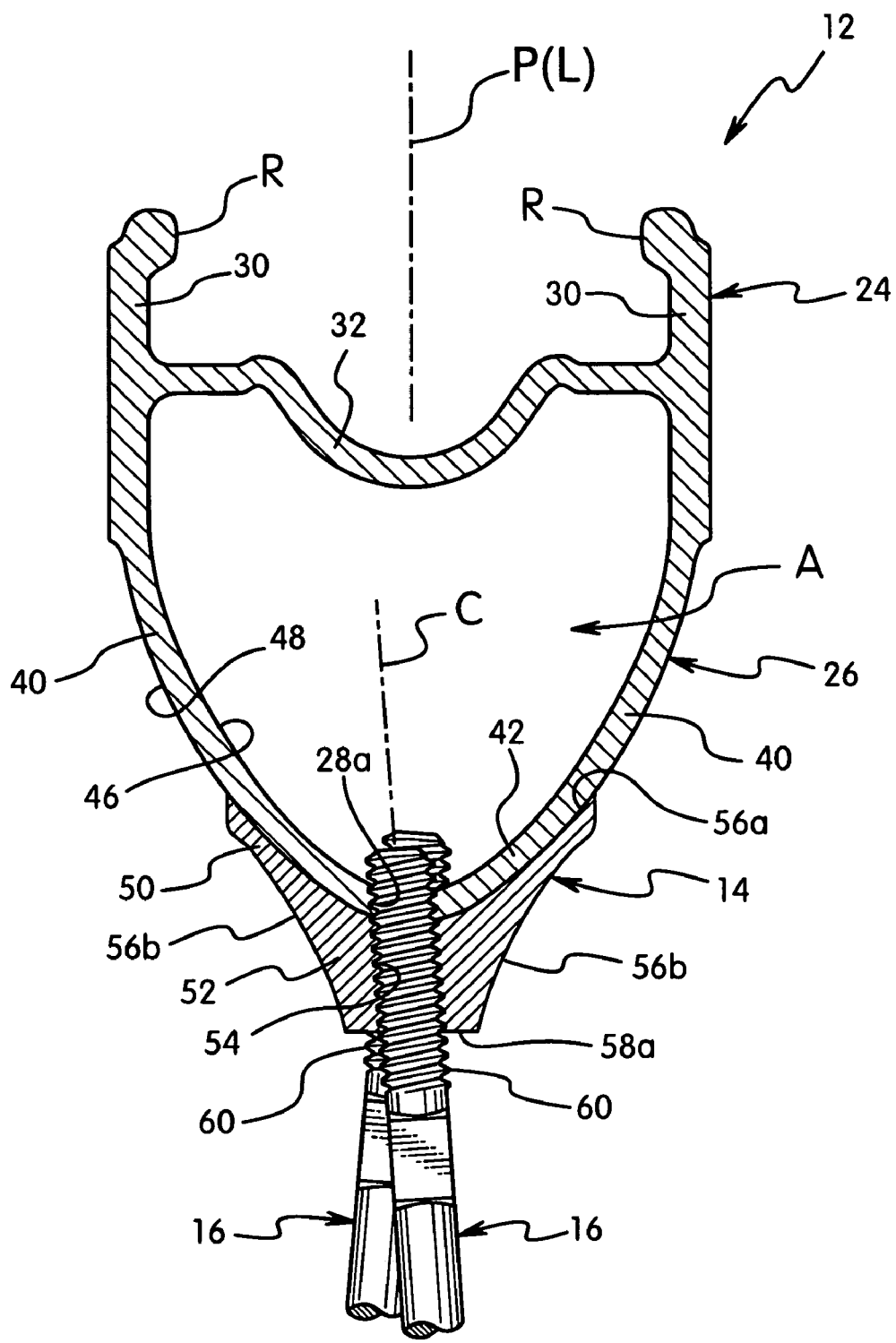
FIG. 2(b) is an enlarged, partial cross-sectional view of the bicycle wheel illustrated in FIG. 1 with the tire removed for the purpose of illustration, as seen along section line 2(b)—2(b) of FIG. 1.

The attachment openings 28a and 28b of the inner annular section 42 are preferably circular-shaped threaded openings with their central axes C angled in opposite directions relative to the center plane P in an alternating manner, as mentioned above. Thus, the spokes 16 can be threadedly coupled within the attachment openings 28a and 28b. The inner annular section 42 preferably has eight of the attachment openings 28a and eight of the attachment openings 28b arranged in an alternating manner about the entire circumference of the rim 12 for a total of sixteen of the attachment openings 28a and 28b in order to attach a total of sixteen spokes 16. Preferably, the attachment openings 28a and 28b are circumferentially equally spaced apart from each other. In other words, the attachment openings 28a are preferably shaped as mirror images (i.e. inverted image) of the attachment openings 28b relative to the center plane P, as best seen in FIGS. 1, 2(a) and 2(b). Thus, the attachment openings 28a are circumferentially offset from the attachment openings 28b in an alternating (interlaced) manner.

The inner annular section 42 preferably includes a single valve opening 44 formed therein for coupling the valve 36 thereto in a conventional manner, as seen in FIGS. 1 and 4. The valve 36 is preferably designed such that the tire 18 can be a tubeless tire. However, it will be apparent to those skilled in the art from this disclosure that the tire 18 could be a tube-type tire (not shown), and that the valve opening 44 could receive the valve of a tube (not shown) in a conventional manner. Thus, the valve opening 44 and/or the valve 36 can be designed for a tubeless tire in a conventional manner, and/or for a tube-type tire in a conventional manner.

The inner annular section 42 together with the annular slanted sections 40 define annular curved interior and exterior surfaces 46 and 48 of the inner annular portion 26. The reinforcement members 14 are preferably fixedly coupled to the exterior surface 48 by welding or brazing such that the reinforcement members 14 contact the exterior surface 48 of the inner annular portion 26. The attachment openings 28a and 28b extend between the interior and exterior surfaces 46 and 48 of the inner annular portion 26.

Referring now to FIGS. 1–8, the reinforcement members 14 will now be discussed in more detail. The reinforcement members 14 are preferably welded or brazed to the exterior surface 48 of the inner annular portion 26 in order to permanently secure the reinforcement members 14 thereto, as mentioned above. Each reinforcement member 14 is preferably constructed as a one-piece unitary member from a lightweight, rigid metallic material. Specifically, each reinforcement member 14 is preferably constructed of aluminum, as mentioned above.

In any case, the reinforcement members 14 are preferably constructed of the same material as the inner annular portion 26 of the rim 12, and are permanently bonded to the inner annular portion 26 to reinforce the rim 12. Specifically, the reinforcement members 14 are fixedly coupled to the inner annular section 42 of the inner annular portion 26 to effectively increase the thickness of the inner annular portion 26 at the attachment openings 28a and 28b to provide rigid reinforcement to the rim 12.

Each reinforcement member 14 basically includes a base portion 50, a projecting portion 52 extending from the base portion 50 and a through opening 54 extending through both the base portion 50 and the projecting portion 52. A dotted (phantom) line divides the base portion 50 and the projecting portion 52 in FIGS. 5 and 6 for the purpose of illustration. Each through opening 54 is preferably a circular-shaped threaded opening. The outer ends of the spokes 16 are threadedly coupled within the through openings 54 to couple the spokes 16 to the rim 12.

The through openings 54 are aligned and coincident with the respective attachment openings 28a and 28b. Thus, the spokes 16 can be adjustably, releasably coupled to the inner annular portion 26 of the rim 12 via the reinforcement members 14 (i.e., the through openings 54) and the inner annular section 42 (i.e., the attachment openings 28a and 28b). In other words, the through openings 54 together with the respective attachment openings 28a and 28b form a plurality of spoke attachment openings with the spokes 16 threadedly coupled therein.

The reinforcement members 14 preferably have the through openings 54 formed therein after fixedly coupling the reinforcement members 14 to the spoke attachment portion 26, as discussed below. The reinforcement member 14 illustrated in FIGS. 5–8 is shown prior to fixedly coupling the reinforcement member 14 to the inner annular portion 26, and thus, prior to forming the through opening 54 therein. The inner attachment portion 26 also preferably has the attachment openings 28a and 28b formed therein after fixedly coupling the reinforcement members 14 thereto, as discussed below.

All of the reinforcement members 14 preferably have identical shapes prior to forming the through opening 54 in each reinforcement member 14, as best shown in FIGS. 5–8. Even after forming the through openings 54, all of the reinforcement members 14 are preferably identical to each other, but mirror images of each other relative to the center plane P due to the inclination of the through openings 54 and the attachment openings 28a and 28b, as best seen in FIGS. 2(a) and 2(b). In other words, the reinforcement members 14 are preferably arranged in an alternating orientation due to the configuration of the respective attachment openings 28a and 28b such that the spokes 16 extend to the appropriate ends of the hub 20, as best seen in FIGS. 1, 2(a) and 2(b). Thus, only one of the reinforcement members 14 will be discussed and/or illustrated in detail herein.

The base portion 50 of each reinforcement member is a plate shaped member that is slightly elongated in the circumferential direction, as seen in FIGS. 5–8. Thus, each reinforcement member 14 preferable has an overall circumferential dimension Y at least as large as an overall axial dimension Z thereof. In the illustrated embodiment, the overall circumferential dimension Y is preferably about 15.2±0.15 millimeters, while the overall axial dimension Z is preferably about 12.8 millimeters. The base portion 50 has a curved rim facing surface 56a, a pair of curved exterior facing surfaces 56b, a pair of axially facing end surfaces 56c and a pair of circumferentially facing end surfaces 56d. The curved exterior facing surfaces 56b also partially define the projecting portion 52 of the reinforcement member 14.

Figures 5, 6:
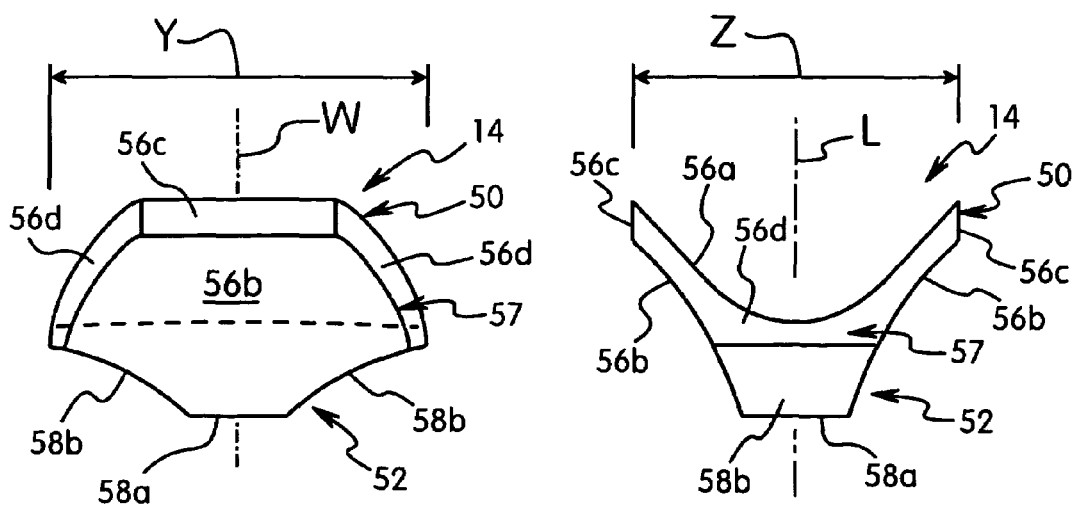
FIG. 5 is an enlarged, side (axial) elevational view of one of the reinforcement members of the bicycle rim illustrated in FIGS. 1–4, prior to forming a through opening therein.
FIG. 6 is an end (circumferential) elevational view of the reinforcement member illustrated in FIG. 5.
Figure 7:
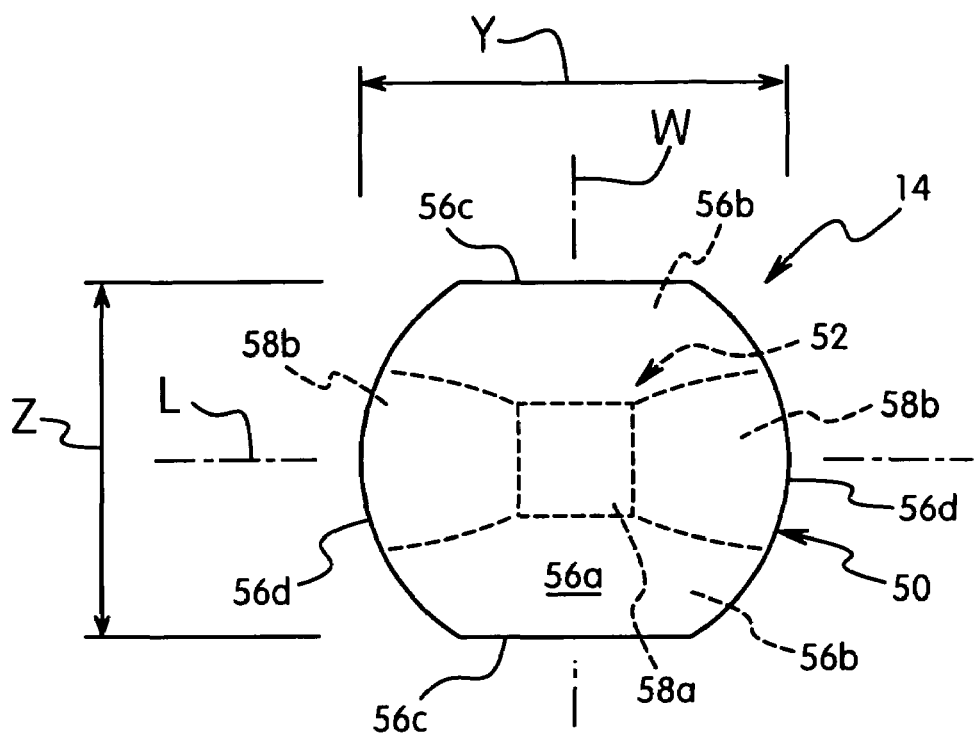
FIG. 7 is an outside elevational view (i.e. outer radial view) of the reinforcement member illustrated in FIGS. 5 and 6.
Figure 8:
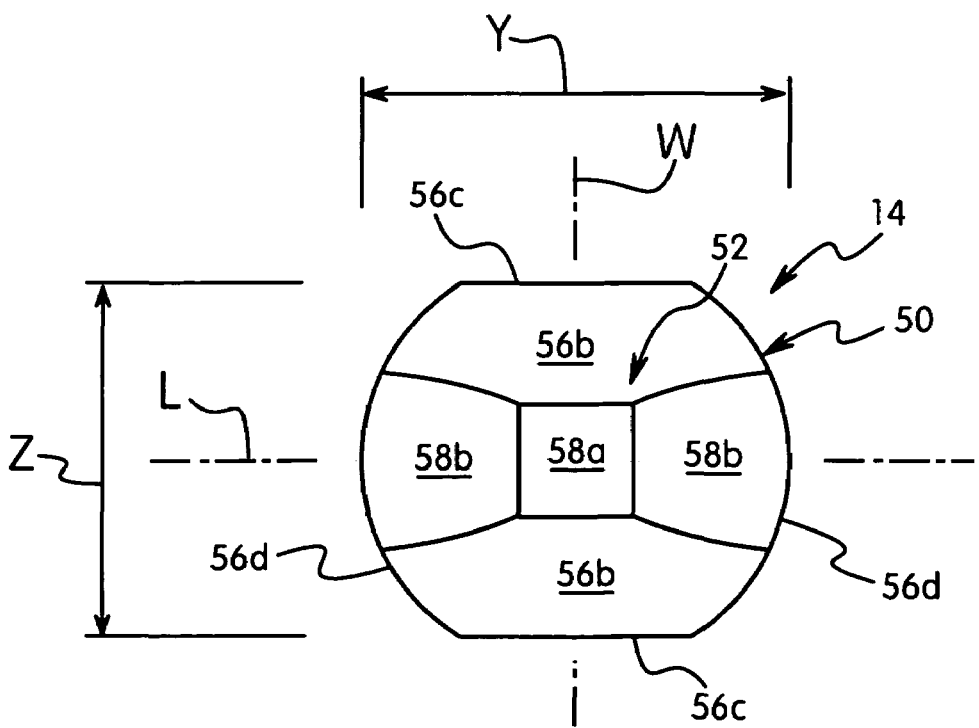
FIG. 8 is an inside elevational view (i.e. inner radial view) of the reinforcement member illustrated in FIGS. 5–7.
Figure 9:
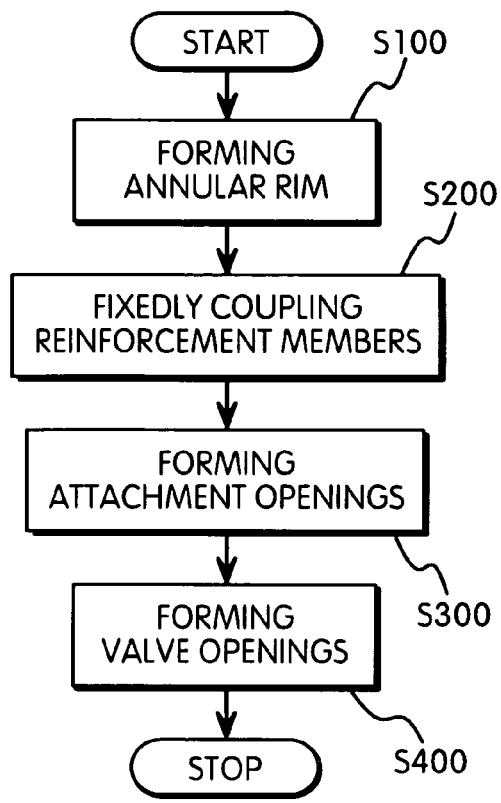
FIG. 9 is a diagrammatic view generally illustrating the method of making the reinforced rim illustrated in FIGS. 1–4.
Figure 10:
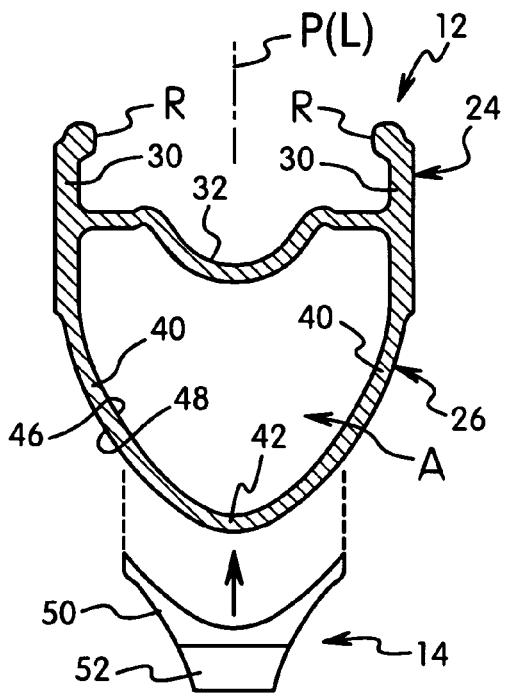
FIG. 10 is a partial cross-sectional view of the rim illustrated in FIG. 1 as seen along section line 2(a)—2(a) of FIG. 1, prior to fixedly coupling the reinforcement members to the spoke attachment portion.
Figure 11:
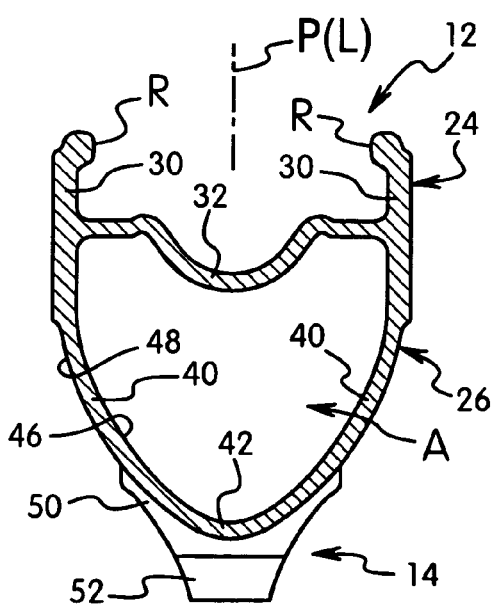
FIG. 11 is a partial cross-sectional view of the rim illustrated in FIG. 1 as seen along section line 2(a)—2(a) of FIG. 1, after to fixedly coupling the reinforcement members to the spoke attachment portion but before forming the attachment openings.
Figure 12:
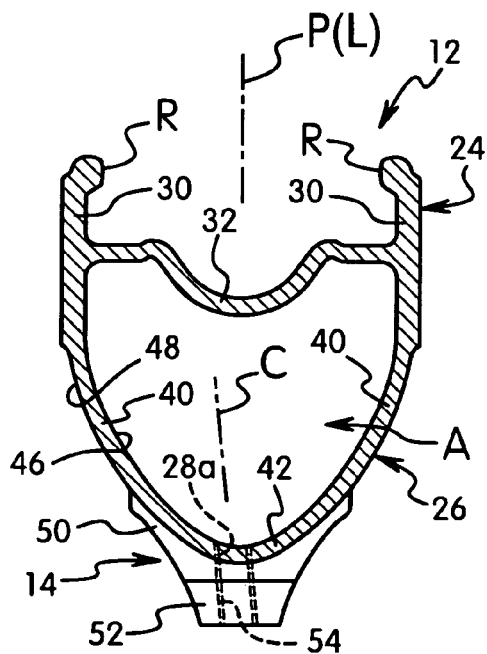
FIG. 12 is a partial cross-sectional view of the rim illustrated in FIG. 1 as seen along section line 2(a)—2(a) of FIG. 1, after to fixedly coupling the reinforcement members to the spoke attachment portion and after forming the attachment openings.
Figure 13:
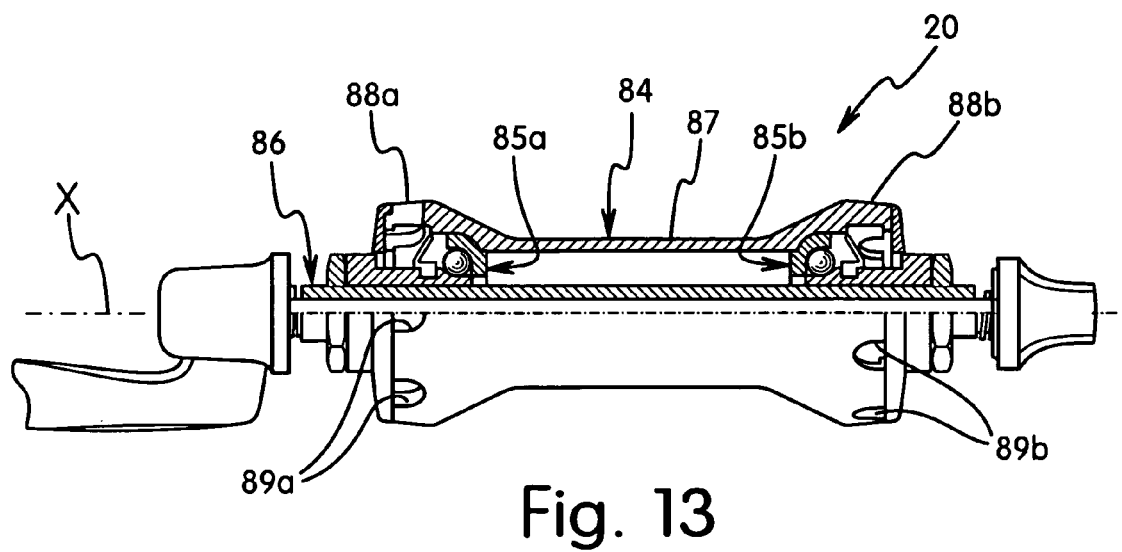
FIG. 13 is an enlarged, top plan view of the hub of the bicycle wheel illustrated in FIG. 1 with portions shown in cross-section for the purpose of illustration.
Figure 14:
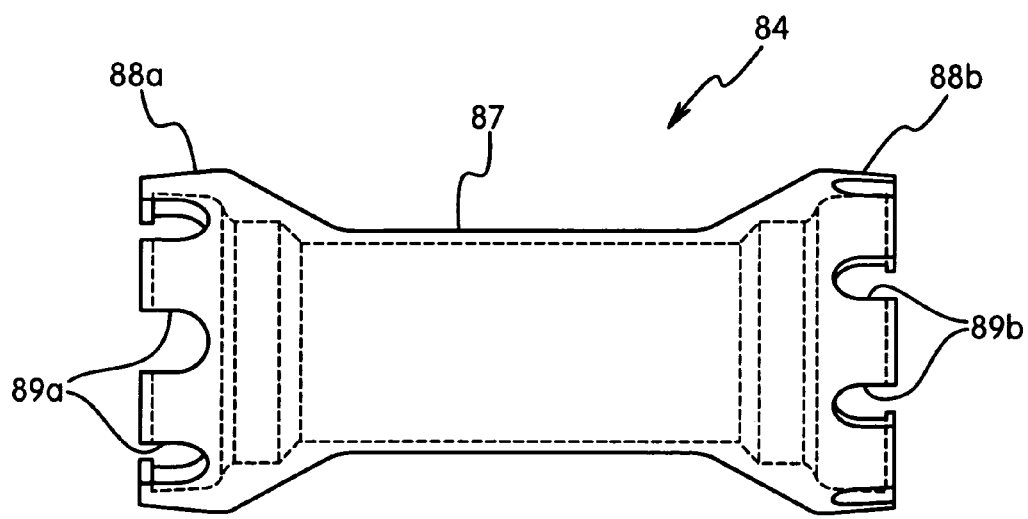
FIG. 14 is an enlarged, top plan view of the hub body of the hub illustrated in FIG. 13.
Figure 15:
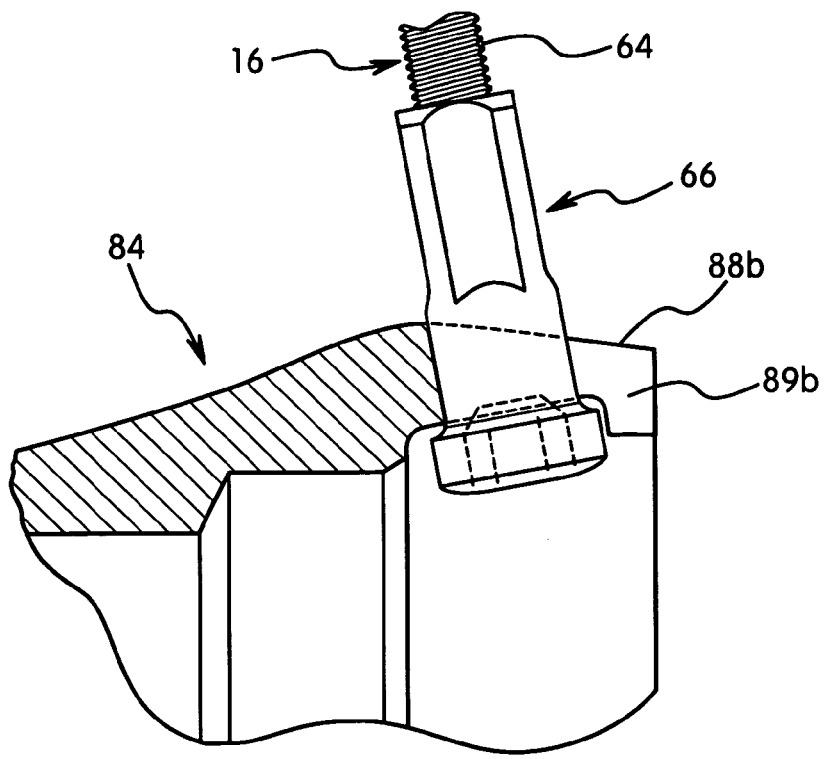
FIG. 15 is a partial, enlarged cross-sectional view of a portion of the hub body illustrated in FIGS. 13 and 14 with a spoke nipple arranged in a spoke hole.
Figure 16:
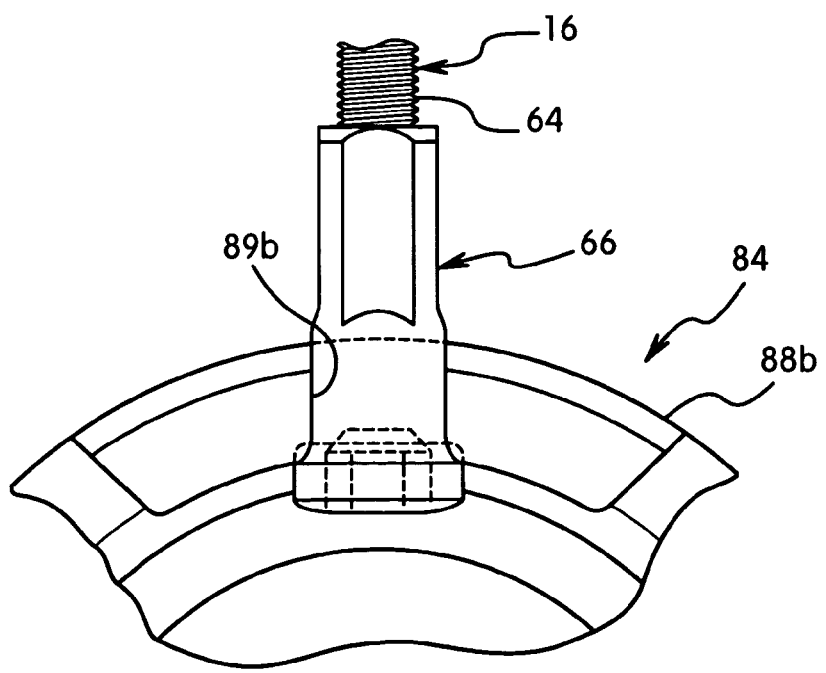
FIG. 16 is a right side elevational view of the portion of the hub body and spoke nipple illustrated in FIG. 15.
Figure 17:
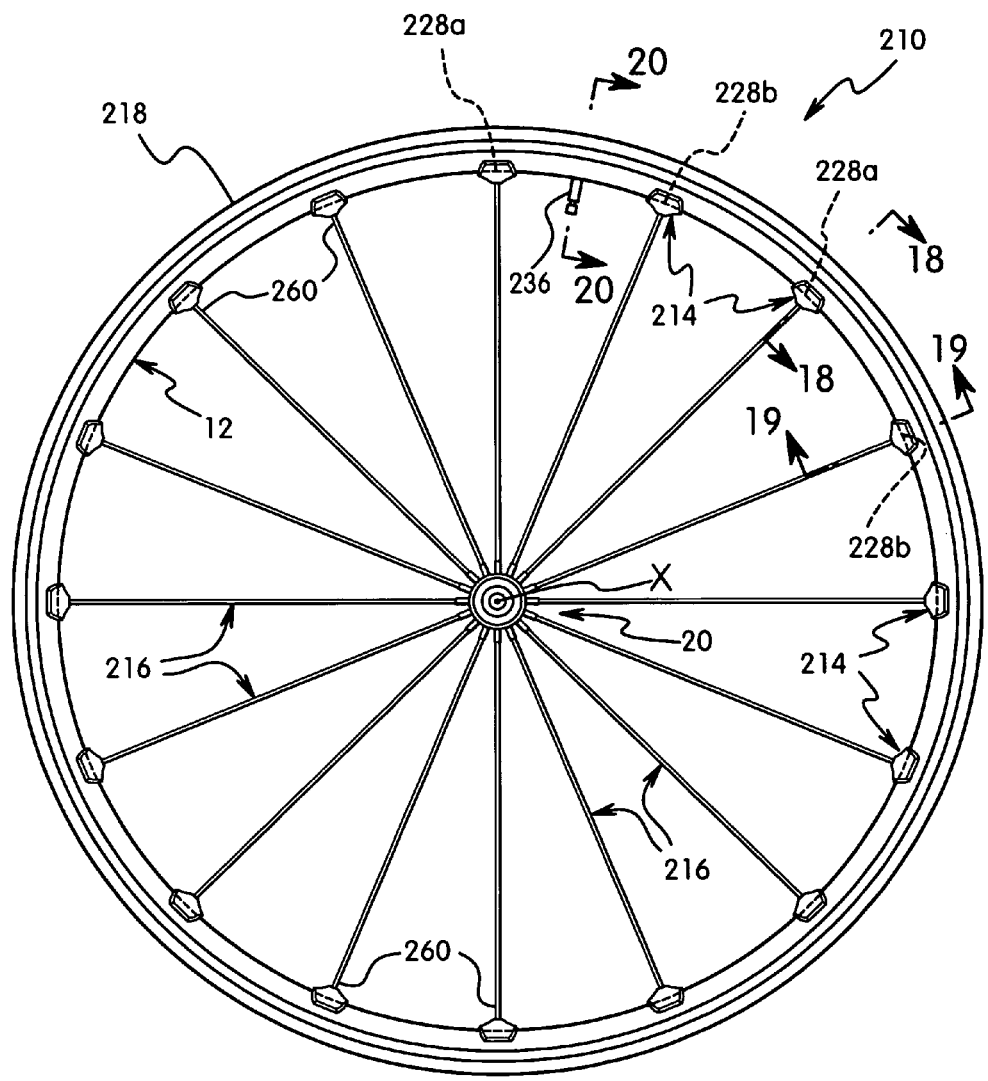
FIG. 17 is a side elevational view of a bicycle wheel with a reinforced rim in accordance with a second preferred embodiment of the present invention.

The rim facing surface 56a of the base portion 50 is curved as viewed in the circumferential direction, as best seen in FIG. 6. The rim facing surface 56a is a contoured surface that corresponds to the contour of the exterior surface 48 of the inner annular portion 26. The exterior facing surfaces 56b taper away from the rim facing surface 56a toward the projection portion 52. The axially facing end surfaces 56c and the circumferentially facing end surfaces 56d extend between the rim facing surface 56a and the exterior facing surfaces 56b to define a first tapered section 57 between the base portion 50 and the projecting portion 52. A second tapered section that is formed by the axially facing end surfaces 56c and the circumferentially facing end surfaces 56d that extends around the periphery of the base portion 50.

The base portion 50 preferably has a symmetrical shape relative to a center longitudinal plane L and a center transverse plane W, as best seen in FIGS. 5–8. However, each reinforcement member 14 is not perfectly or exactly symmetrical relative to the center plane P, which coincides with the center longitudinal plane L of the reinforcement member 14, after forming the through opening 54 due to the inclination of the through opening 54.

The base portion 50 preferably has a thickness approximately equal to or slightly smaller than the thickness of the inner annular portion 26 of the rim 12. The thickness of the base portion 50 tapers to a thickness larger than the thickness of the inner annular portion 26 as the base portion 50 approaches the projecting portion 52. The outer periphery of the base portion 50 can optionally include a plurality of welding projections (not shown) that extend from the rim facing surface 56a, prior to fixedly coupling the reinforcement member 14 to the inner annular portion 26. Such optional welding projections can provide the brazing or welding material for melting, bonding and/or fusing the reinforcement members 14 to the inner annular portion 26.

The projecting portion 52 of each reinforcement member 14 extends from the base portion 50 away from one of the attachment openings 28a or 28b. In other words, the projecting portion 52 extends radially inwardly from the base portion 50. The projecting portion 52 basically includes an end surface 58a, a pair of curved exterior circumferential surfaces 58b and radially inner segments of the exterior facing surfaces 56b. In other words, the exterior facing surfaces 56b extend continuously along the base portion 50 and the projecting portion 52.

The end surface 58a is preferably spaced radially inwardly about 3.8±0.1 millimeters from the radially innermost edge of the rim facing surface 56a, while the outermost radial edges of the base portion 50 (i.e., the radially outermost edges of the rim facing surface 56a) is preferably spaced radially inwardly about 5.0 millimeters from the radially innermost edge of the rim facing surface 56a. The end surface 58a preferably has a square shape that is about 4.0 millimeters long in the axial direction and the circumferential direction.

The projecting portion 52 of each reinforcement member preferably has a symmetrical shape relative to the center longitudinal plane L and the center transverse plane W, as best seen in FIGS. 5–8. However, each reinforcement member 14 is not perfectly or exactly symmetrical relative to the center plane P, which coincides with the center longitudinal plane L of the reinforcement member 14, after forming the through opening 54 due to the inclination of the through openings 54.

As best seen in FIGS. 3(a) and 3(b), each of the reinforcement members 14 has a first overlapping dimension $D_1$ and a second overlapping dimension $D_2$ corresponding to the minimum and maximum amounts of overlap of the reinforcement members 14 with the inner annular portion 26. The first and second overlapping dimensions $D_1$ and $D_2$ are measured in a direction transverse to (i.e., substantially perpendicular to) the central axis C of each of the attachment openings 28a and 28b. The center axes C of the attachment openings 28a and 28b are also the central axes of the through openings 54.

More specifically, the first and second overlapping dimensions $D_1$ and $D_2$ are preferably measured substantially in the axial direction and in the circumferential direction, respectively, with respect to the rim 12. Thus, the actual overlapping dimension of the reinforcement member 14 with the inner annular portion 26 varies between the first and second overlapping dimensions $D_1$ and $D_2$. This overlapping arrangement of the reinforcement members 14 with the inner annular portion 26 aids in dispersing the stresses on the rim 12 from the spokes 16.

Each of the attachment openings 28a and 28b and each through opening 54 has maximum transverse dimension T corresponding to the diameter of each attachment opening 28a or 28b and each through opening 54. In other words, each through opening 54 has a size and shape identical to the size and shape of the respective attachment opening 28a or 28b, as viewed along the central axes C thereof.

The first overlapping dimension $D_1$ is preferably about twice as large as a maximum transverse dimension T of the through opening 54, while the second overlapping dimension $D_2$ is preferably about three times as large as the maximum transverse dimension T of the through opening 54. In any case, the second (maximum) overlapping dimension $D_2$ is at least as large as the maximum transverse dimension T of the through opening 54. Preferably, the first (minimum) overlapping dimension $D_1$ is also at least as large as the maximum transverse dimension T of the through opening 54, and the second overlapping dimension $D_2$ is larger than the first overlapping dimension $D_1$.

Referring now to FIGS. 1–4, 13 and 14, the spokes 16 will now be discussed in more detail. The spokes 16 are preferably identical to each other. Each of the spokes 16 basically includes an outer end portion 60, a center or a middle portion 62, an inner end portion 64 and a spoke nipple 66. The outer end portion 60, the center portion 62, and the inner end portion 64 of each spoke 16 are preferably integrally formed together as a one-piece, unitary member. The spoke nipples 66 are preferably formed as separate members.

Each of the outer end portions 60 of the spokes 16 has external threads to engage one of the threaded through openings 54 of one of the reinforcement members 14 and one of the attachment openings 28a or 28b. The outer end portion 60 of each spoke also preferably has a square section used to rotate or hold the spokes 16. Preferably, each of the outer end portions 60 threadedly engages one of the through openings 54 and one of the attachment openings 28a or 28b.

Each of the inner end portions 64 of the spokes 16 preferably has external threads with one of the spoke nipples 66 threadedly coupled thereto in a conventional manner. The spokes 16 are placed under tension between the hub 20 and the rim 12 by rotating the spoke nipples 66 and/or the spokes 16 in a relatively conventional manner. The spokes 16 are preferably conventional wire-type spokes. Thus, the spokes 16 will not be discussed and/or illustrated in detail herein except as related to the rim 12 of the present invention.

Referring to FIGS. 1 and 13–16, the connections of the spokes 16 to the hub 20 will now be discussed in more detail. The connections of the spokes 16 to the hub 20 are basically identical to the connections disclosed in U.S. Pat. No. 6,431,658, except as explained below. In particular, the hub 20 is a slightly modified version of the front hub disclosed in U.S. Pat. No. 6,431,658, which is designed to be used with the rim 12 having circumferentially equally spaced spoke attachment points. Of course, it will be apparent to those skilled in the art that the rim 12 of the present invention could be coupled to a modified hub that includes rear sprockets, i.e. that is similar to the rear hub disclosed in U.S. Pat. No. 6,431,658, but modified to accommodate the circumferentially equally spaced spoking arrangement disclosed herein. Moreover, it will be apparent to those skilled in the art from this disclosure that the rim 12 with reinforcement members 14 could be modified in order to accommodate such a spoking arrangement or other spoking arrangements as needed and/or desired.

The hub 20 basically includes a tubular hub body portion 84, first and second bearing assemblies 85a and 85b, and a hub axle 86 rotatably supported in the tubular body portion 84 by the bearing assemblies 85a and 85b. The parts of the hub 20 are relatively conventional. Thus, the parts of the hub 20 will not be discussed or illustrated in detail herein.

The tubular body portion 84 has a tubular center portion 87 and a pair of tubular mounting portions 88a and 88b at opposite ends of the center portion 87 for mounting the spokes 16 thereto. Each tubular mounting portion 88a and 88b has a plurality of spoke openings 89a and 89b for coupling the spokes 16 therein, respectively. Preferably, each mounting portion 88a and 88b has eight spoke openings 89a and 89b formed therein, respectively.

Preferably, the second mounting portion 88b is an offset mirror image of first mounting portion 88a. Thus, the spoke openings 89b are preferably circumferentially offset from the spoke openings 89a so that the outer end portions 64 of the spokes 16 are circumferentially equally spaced from each other at the rim 12. The tubular mounting portions 88a and 88b support the spokes 16 in the spoke openings 89a and 89b with the spoke nipples 66.

Referring now to FIGS. 9–12, the method of making the rim 12 in accordance with the present invention will now be discussed in more detail. First, in step S100, the annular rim 12 (i.e., separate from the reinforcement members 14) is preferably formed that includes the outer annular portion 24 and the inner annular portion 26. For example, the outer annular portion 24 and the inner annular portion 26 are preferably constructed by first extruding a length of aluminum with the cross-sectional shape illustrated in FIGS. 2–4. Next, the length of aluminum is preferably bent into a circular shape, and the ends of the length of aluminum are then welded together to form the rim 12 absent the reinforcement members 14.

Next, in step S200, the reinforcement members 14 are preferably fixedly coupled to the inner annular portion 26 of the rim 12 by welding or brazing around the outer periphery of each reinforcement member 14. The reinforcement members 14 are preferably constructed as individual one-piece members having the configuration illustrated in FIGS. 5–8 by casting, machining, or the like, as mentioned above. Then the individual reinforcement members 14 are fixedly coupled to the inner annular portion 26. If the reinforcement members 14 are welded, preferably each reinforcement member 14 is welded by flash-butt or laser welding. In any case a thin bonding layer is formed to fuse the reinforcement members 14 to the inner annular portion 26 of the rim 12.

Next, in step S300, the attachment openings 28a and 28b and the through openings 54 are preferably formed in the rim 12 by first punching or drilling holes (i.e., other than backflow drilling), and then by machining the holes to be threaded. The attachment openings 28a and 28b and the respective through openings 54 are preferably formed at the same time as each other. In other words, each of the through openings 54 of the reinforcement members 14 is preferably formed simultaneously with a respective one of the attachment openings 28a or 28b during step S300.

Next, in step S400, the valve aperture 34 and the valve opening 44 are preferably formed by punching or drilling in a conventional manner. After the rim is complete, the spokes 16 are threadedly coupled to both the rim 12 and the central hub 20. Then, the valve 36 and the tire 18 can be coupled to the rim 12 in a conventional manner.

The method of making the rim 12 discussed above is merely an example of one preferred method of the present invention. Thus, it will be apparent to those skilled in the art from this disclosure that the method steps S100, S200, S300 and S400 could be performed in alternate orders in order to achieve the rim 12 of the present invention as needed and/or desired. Moreover, it will be apparent to those skilled in the art from this disclosure that parts (i.e., sub-steps) of the method steps S100, S200, S300 and S400 could be performed in alternate or interlaced orders in order to achieve the rim 12 of the present invention as needed and/or desired, without departing from the scope of the present invention.

For example, the reinforcement members 14 could be fixedly coupled (i.e., step S200) to the length of extruded aluminum that is formed during step S100 prior to bending the length of aluminum into the circular shape of the rim 12. In such a method, the through openings 54, the attachment openings 28a and 28b, the valve aperture 34 and the valve opening 44 could be formed before or after bending the length of aluminum into a circular shape. Moreover, the forming of the through openings 54, the attachment openings 28a and 28b, the valve aperture 34 and the valve opening 44 (i.e., steps S300 and S400) could be performed before or after fixedly coupling the reinforcement members 14 (i.e., step S200).

Second Embodiment

Referring now to FIGS. 17–20, a bicycle wheel 210 in accordance with a second preferred embodiment of the present invention will now be explained. The bicycle wheel 210 is similar to the bicycle wheel 10 of the first embodiment. Specifically, the bicycle wheel 210 uses a modified rim 212 having modified reinforcement members 214 with modified spokes 216 coupled thereto. More specifically, the rim 212 is designed to be used with a conventional tube-type tire 218. Additionally, the rim 212 is designed to be used with the modified spokes 216 that have enlarged heads 261 at their outer end portions 260 rather than threaded outer ends. The reinforcement members 214 of the rim 212 are also modified in order to be used with the modified spokes 216.

In view of the similarities between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Additionally, in view of the similarities between this second embodiment and the first embodiment, the descriptions and illustrations of this second embodiment will focus mainly on the differences between this second embodiment and the first embodiment. However, it will be apparent to those skilled in the art from this disclosure that the descriptions and illustrations of the first embodiment also apply to this second embodiment, except as explained and illustrated herein.

The bicycle wheel 210 of this second embodiment basically includes the rim 212 with the reinforcement members 214, the spokes 216, a tube-type tire 218 and a hub 20. In other words, the modified rim 212 and the modified spokes 216 of this second embodiment are designed to be used with the hub 20 of the first embodiment.

The rim 212 basically includes a modified outer annular portion 224 (i.e., tire attachment portion), a modified inner annular portion 226 (i.e., spoke attachment portion) having a plurality of modified attachment openings 228a and 228b and the modified reinforcement members 214 fixedly coupled to the inner annular portion 226 at the attachment openings 228a and 228b, preferably by welding or brazing in a manner identical to the first embodiment.

Figure 18:
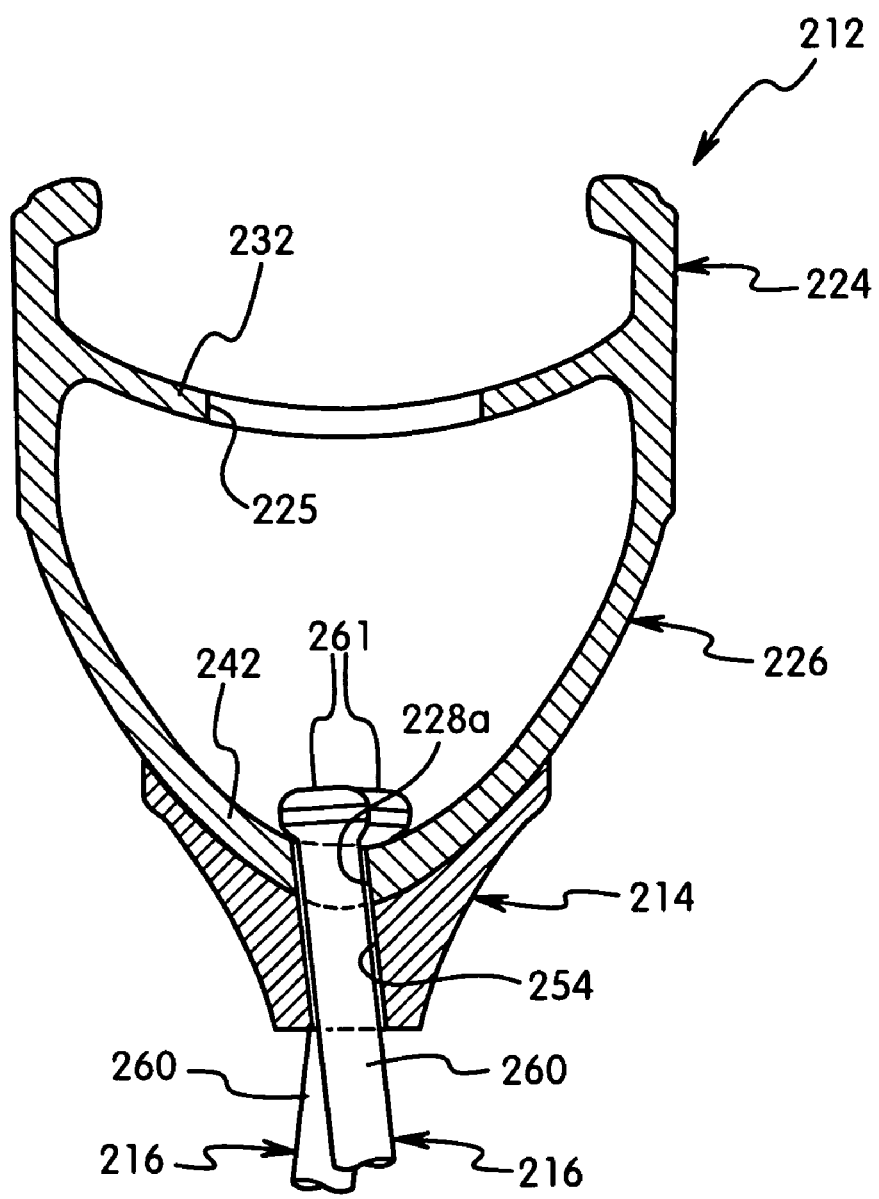
FIG. 18 is an enlarged, partial cross-sectional view of the bicycle wheel illustrated in FIG. 17 with the tire removed for the purpose of illustration, as seen along section line 18—18 of FIG. 17.
Figure 19:
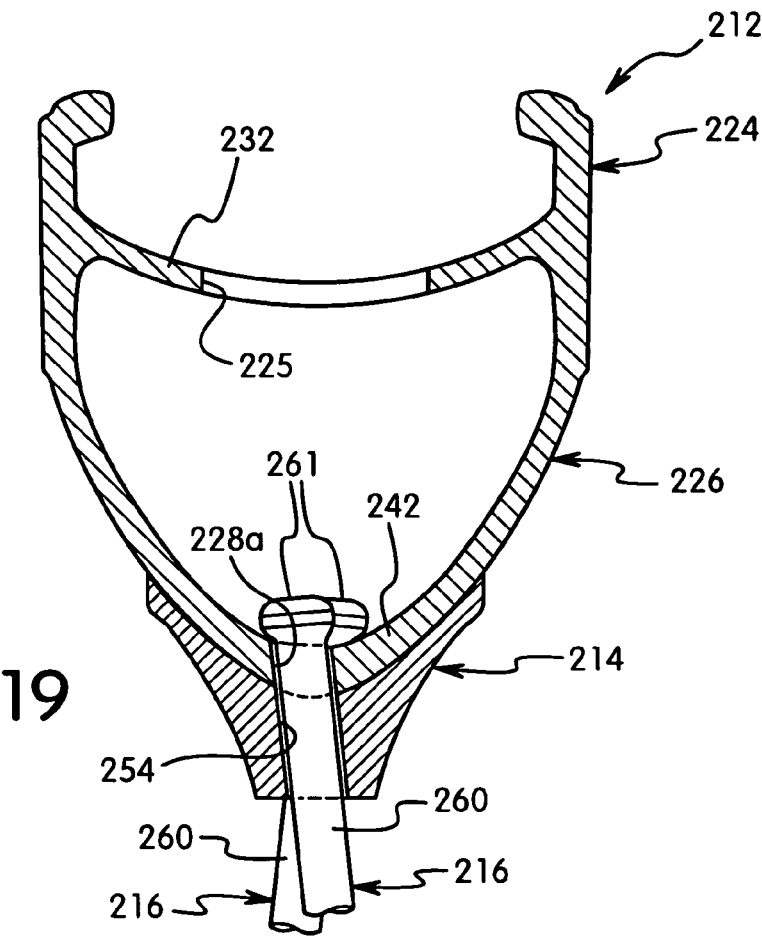
FIG. 19 is an enlarged, partial cross-sectional view of the bicycle wheel illustrated in FIG. 17 with the tire removed for the purpose of illustration, as seen along section line 19—19 of FIG. 17.
Figure 20:
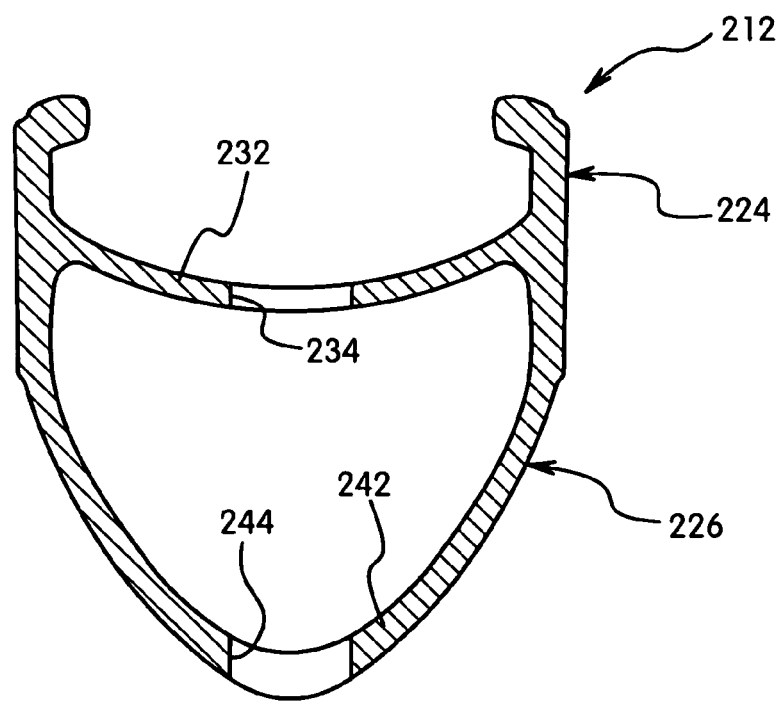
FIG. 20 is an enlarged, partial cross-sectional view of the bicycle wheel illustrated in FIG. 17 with the tire removed for the purpose of illustration, as seen along section line 20—20 of FIG. 17.

In this second embodiment, the outer annular portion 224 is basically substantially identical to the outer annular portion 24 of the first embodiment, except that the outer annular portion 224 includes a plurality of circumferentially equally spaced access openings 225 formed in a modified annular bridge or connecting section 232. The outer annular portion 224 also has a modified cross-sectional shape as shown in FIGS. 18–20 particularly suited for use with the tube-type tire 218. The access openings 225 are aligned with the attachment openings 228a and 228b such that each of the spokes 216 can be inserted through one of the access openings 225 into one of the attachment openings 228a or 228b. Preferably there are a number of access openings 225 corresponding to the overall number of attachment openings 228a and 228b (e.g., sixteen). The annular connecting section 232 also includes a valve aperture 234 designed to receive a valve 236 of a tube (not shown) therein in a conventional manner.

The inner annular portion 226 is substantially identical to the inner annular portion 26 of the first embodiment except that the inner annular portion 226 includes a modified inner annular section 242. Specifically, the inner annular section 242 is thicker than the inner annular section 42 of the first embodiment, and has the modified attachment openings 228a and 228b and a valve opening 244 formed therein. The attachment openings 228a and 228b are identical to the attachment openings 28a and 28b of the first embodiment, respectively, except the attachment openings 228a and 228b are not threaded, and are longer due to the increased thickness of the inner annular section 242. The valve opening 244 is designed to receive the valve 236 of a tube (not shown) therein in a conventional manner.

The reinforcement members 214 are identical to the reinforcement members 14 of the first embodiment, except that each of the reinforcement members 214 includes a modified through opening 254 that is not threaded. Thus, the reinforcement members 214 are identical to the reinforcement member 14 illustrated in FIGS. 5–8, prior to forming the through openings 254 therein. Accordingly, the reinforcement members 214 will not be discussed and/or illustrated in detail herein.

The spokes 216 will now be discussed in more detail. The spokes 216 are identical to the spokes 16 of the first embodiment, except that each of the spokes 216 includes a modified outer end portion 260. Specifically, the outer end portion 260 of each spoke 216 includes an enlarged head 261 arranged at the free end thereof, as mentioned above. Thus, the spokes 216 are insertable through the access openings 225 into the attachment openings 228a and 228b and the through openings 254 until the enlarged heads 261 are properly seated within the rim 212, as seen in FIGS. 18 and 19. The spokes 216 are relatively conventional. Accordingly, the spokes 216 will not be discussed in further detail herein.

The rim 212 of this second embodiment is preferably constructed in a manner identical to the rim 12 of the first embodiment, except that the through openings 254 of the reinforcement members 214 are formed as unthreaded openings. In other words, the step or steps of machining the spoke attachment openings (i.e., the through openings 54 and the attachment openings 228a and 228b) to create the threaded spoke attachment openings of the first embodiment are omitted in this second embodiment.

Of course, it will be apparent to those skilled in the art from this disclosure that the attachment openings 228a and 228b and the through openings 254 could be constructed to be identical to each other if needed and/or desired. In such an arrangement, the attachment openings 228a and 228b and the through openings 254 should be sufficiently large so that the spokes 216 can be inclined relative to the center plane of the rim 212 such that the spokes 216 extend to opposite ends of the hub 20. Of course, the precise orientation of the spokes with such a further modified rim will depend on the type of hub utilized.

As used herein, the following directional terms "radially, axially, peripherally, circumferentially" as well as any other similar directional terms refer to those directions of an annular bicycle rim 12 extending around a center axis X in accordance with the present invention. Accordingly, these terms, as utilized to describe the present invention should be interpreted relative to the center axis X with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim comprising:
an annular tire attachment portion adapted to have a tire mounted thereon;
an annular spoke attachment portion fixedly coupled with said tire attachment portion to form an annular hollow area, said spoke attachment portion including a plurality of circumferentially spaced spoke attachment openings with each of said spoke attachment openings having a central axis; and
a plurality of separate reinforcement members fixedly coupled to an exterior surface of said spoke attachment portion at said attachment openings to effectively increase the thickness of said spoke attachment portion of said rim at said attachment openings, each of said reinforcement members being located entirely exteriorly of said spoke attachment portion and having a through opening that is aligned with one of said attachment openings, said through opening having an inner diameter that is configured and arranged to allow a spoke to be adjustably and releasably coupled thereto,
each of said reinforcement members including:
a projecting portion extending inwardly from one of said spoke attachment openings in a radial direction of the rim to an end surface spaced radially inwardly of said exterior surface of said spoke attachment portion, and
a rim-facing surface overlying an attachment area of said exterior surface of said spoke attachment portion that surrounds a corresponding one of said spoke attachment openings,
said attachment areas of said exterior surface of said spoke attachment portion being free of any through openings except for said spoke attachment openings.

2. The bicycle rim according to claim 1, wherein
each of said through openings is substantially coincident with a respective one of said spoke attachment openings as viewed along said central axis of said spoke said attachment openings.

3. The bicycle rim according to claim 1, wherein
each of said reinforcement members has a maximum overlapping dimension that overlaps said annular spoke attachment portion that is at least as large as a maximum transverse dimension of a respective one of said spoke attachment openings as measured from an outer peripheral edge of said reinforcement member to said respective one of said spoke attachment openings.

4. The bicycle rim according to claim 1, wherein
said rim-facing surface corresponds to a contour of said exterior surface of said spoke attachment portion.

5. The bicycle rim according to claim 1, wherein
each of said reinforcement members is welded to said spoke attachment portion.

6. The bicycle rim according to claim 5, wherein
each of said reinforcement members is welded around an outer periphery thereof that is spaced from a respective one of said spoke attachment openings.

7. The bicycle rim according to claim 1, wherein
each of said reinforcement members is brazed onto said spoke attachment portion.

8. The bicycle rim according to claim 7, wherein
each of said reinforcement members is brazed around an outer periphery thereof that is spaced from a said respective one of said spoke attachment openings.

9. The bicycle rim according to claim 1, wherein
each of said spoke attachment openings of said spoke attachment portion is threaded, and said through opening of each of said reinforcement members is threaded.

10. The bicycle rim according to claim 1, wherein
each of said attachment openings of said spoke attachment portion is unthreaded, and said through opening of each of said reinforcement members is unthreaded.

11. The bicycle rim according to claim 1, wherein
said spoke attachment portion includes a pair of annular side sections extending radially outwardly from an inner annular section to form a first substantially U-shaped cross-sectional shape as viewed in a transverse cross-sectional direction; and
said tire attachment portion includes a pair of annular tire support sections and an annular bridge section that extends between said tire support sections to from a second substantially U-shaped cross-sectional shape as viewed in said transverse cross-sectional direction in order to form said annular hollow area together with said spoke attachment portion.

12. The bicycle rim according to claim 11, wherein
said annular bridge section is free of openings except for a single valve aperture formed therein; and
said spoke attachment portion includes a valve opening aligned with said single valve aperture of said annular bridge section.

13. The bicycle rim according to claim 11, wherein
said annular side sections and said inner annular section of said spoke attachment portion, and said annular tire support sections and said annular bridge section of said tire attachment portion are integrally formed together as a one-piece, unitary member that is separate from said reinforcement members.

14. The bicycle rim according to claim 1, wherein
said spoke attachment openings are formed in an inner annular section of said spoke attachment portion that forms an inner radial periphery of said rim such that said central axes of attachment openings extend in a substantially radial direction of said rim.

15. The bicycle rim according to claim 14, wherein
each of said reinforcement members has a symmetrical shape relative to a center plane of said rim, and
each of said reinforcement members has a symmetrical shape relative to a center radial plane thereof that is perpendicular to said center plane.

16. The bicycle rim according to claim 14, wherein
each of said reinforcement members has a maximum overall circumferential dimension at least as large as a maximum overall axial dimension thereof.

17. The bicycle rim according to claim 14, wherein
each of said reinforcement members has a base portion with a first thickness and said projecting portion extends radially inwardly from said base portion such that said projecting portion has a second thickness that is at least twice said first thickness, and
said through opening of each reinforcement member is formed in said projecting portion.

18. The bicycle rim according to claim 17, wherein
said base portion of each of said reinforcement members includes a tapered section extending around an outer periphery thereof.

19. The bicycle rim according to claim 14, wherein
each of said through openings is substantially coincident with a respective one of said spoke attachment openings as viewed along said central axis of said spoke attachment openings.

20. The bicycle rim according to claim 14, wherein
each of said reinforcement members has a maximum overlapping dimension that overlaps said annular spoke attachment portion that is at least as large as a maximum transverse dimension of a respective one of said attachment openings as measured from an outer peripheral edge of said reinforcement member to said respective one of said attachment openings.

21. The bicycle rim according to claim 1, wherein
said spoke attachment portion of said rim has a substantially uniform radial thickness in an annular area where said reinforcement members are fixed.

22. The bicycle rim according to claim 1, wherein
said spoke attachment portion and said tire attachment portion are integrally formed together as a one-piece, unitary member that is separate from said reinforcement members.

23. A method of making a bicycle rim, comprising:
forming an annular rim that includes an annular tire attachment portion and an annular spoke attachment portion fixedly coupled with the annular tire attachment portion to form an annular hollow area;
fixedly coupling a plurality of reinforcement members to an exterior surface of the spoke attachment portion such that the reinforcement members are located entirely exteriorly of the spoke attachment portion in a circumferentially spaced arrangement to effectively increase the thickness of the spoke attachment portion; and
forming a plurality of attachment openings with one of the attachment openings extending through one of the reinforcement members and through the spoke attachment portion of the rim, each of the attachment openings having an inner diameter that is configured and arranged to allow a spoke to be adjustably and releasably coupled thereto, each of said reinforcement members including:
- a projecting portion extending inwardly from one of said attachment openings in a radial direction of the rim to an end surface spaced radially inwardly of said exterior surface of said spoke attachment portion, and
- a rim facing surface overlying an attachment area of said exterior surface of said spoke attachment portion that surrounds a corresponding one of said attachment openings,
- said attachment areas of said exterior surface of said spoke attachment portion being free of any through openings except for said spoke attachment openings.

24. The method according to claim 23, wherein the forming of the attachment openings occurs after fixedly coupling the reinforcement members to the spoke attachment portion.

25. The method according to claim 23, further comprising forming internal threads in the attachment openings.

26. The method according to claim 23, wherein the fixedly coupling of the reinforcement members to the annular spoke attachment portion is achieved by welding.

27. The method according to claim 23, wherein the fixedly coupling of the reinforcement members to the annular spoke attachment portion is achieved by brazing.

28. The method according to claim 23, wherein the forming of the annular rim includes forming the spoke attachment portion with a pair of annular side sections extending radially outward from an inner annular section to form a first substantially U-shaped cross-sectional shape as viewed in a transverse cross-sectional direction, and
the forming of the annular rim includes forming the tire attachment portion with a pair of annular tire support sections and an annular bridge section that extends between the tire support sections to form a second substantially U-shaped cross-sectional shape as viewed in the transverse cross-sectional direction.

29. The method according to claim 28, wherein the annular side sections and the inner annular section of the spoke attachment portion, and the annular tire support sections and the annular bridge section of the tire attachment portion are integrally formed together as a one-piece, unitary member during the forming of the annular rim.

30. The method according to claim 28, wherein the plurality of attachment openings are formed in the inner annular section of the spoke attachment portion.

31. The method according to claim 30, further comprising forming internal threads in the attachment openings.

32. The method according to claim 31, further comprising forming a single valve aperture in the annular bridge section without forming any other openings in the annular bridge section; and
forming a single valve opening in the spoke attachment portion that is aligned with the single valve aperture of the annular bridge section.

33. The method according to claim 30, further comprising forming a plurality of circumferentially spaced access openings in the annular bridge section that are configured to be substantially aligned in a radial direction with the plurality of attachment openings.

34. A bicycle rim comprising:
an annular tire attachment portion adapted to have a tire mounted thereon;
an annular spoke attachment portion fixedly coupled with said tire attachment portion to form an annular hollow area, said spoke attachment portion including a plurality of circumferentially spaced spoke attachment openings with each of said spoke attachment openings having a central axis; and
a plurality of separate reinforcement members fixedly coupled to an exterior surface of said spoke attachment portion at said spoke attachment openings to effectively increase the thickness of said spoke attachment portion of said rim at said spoke attachment openings, each of said reinforcement members being located entirely exteriorly of said spoke attachment portion and having a through opening that is aligned with one of said spoke attachment openings, said through opening having an inner diameter that is configured and arranged to allow a spoke to be adjustably and releasably coupled thereto,
each of said reinforcement members having a base portion with a first thickness and a central projecting portion extending radially inwardly from said base portion, said projecting portion having a second thickness that is at least twice said first thickness,
said through opening of each reinforcement member being formed in said projecting portion, and
said spoke attachment openings being formed in an inner annular section of said spoke attachment portion that forms an inner radial periphery of said rim such that said central axes of said spoke attachment openings extend in a substantially radial direction of said rim.

35. The bicycle rim according to claim 34, wherein said base portion of each of said reinforcement members includes a tapered section extending around an outer periphery thereof.

* * * * *